Aug. 27, 1940.  A. N. SPÁNEL  2,213,150
RUBBER GARMENT AND FORM FOR MAKING THE SAME
Filed Feb. 26, 1938  8 Sheets-Sheet 1
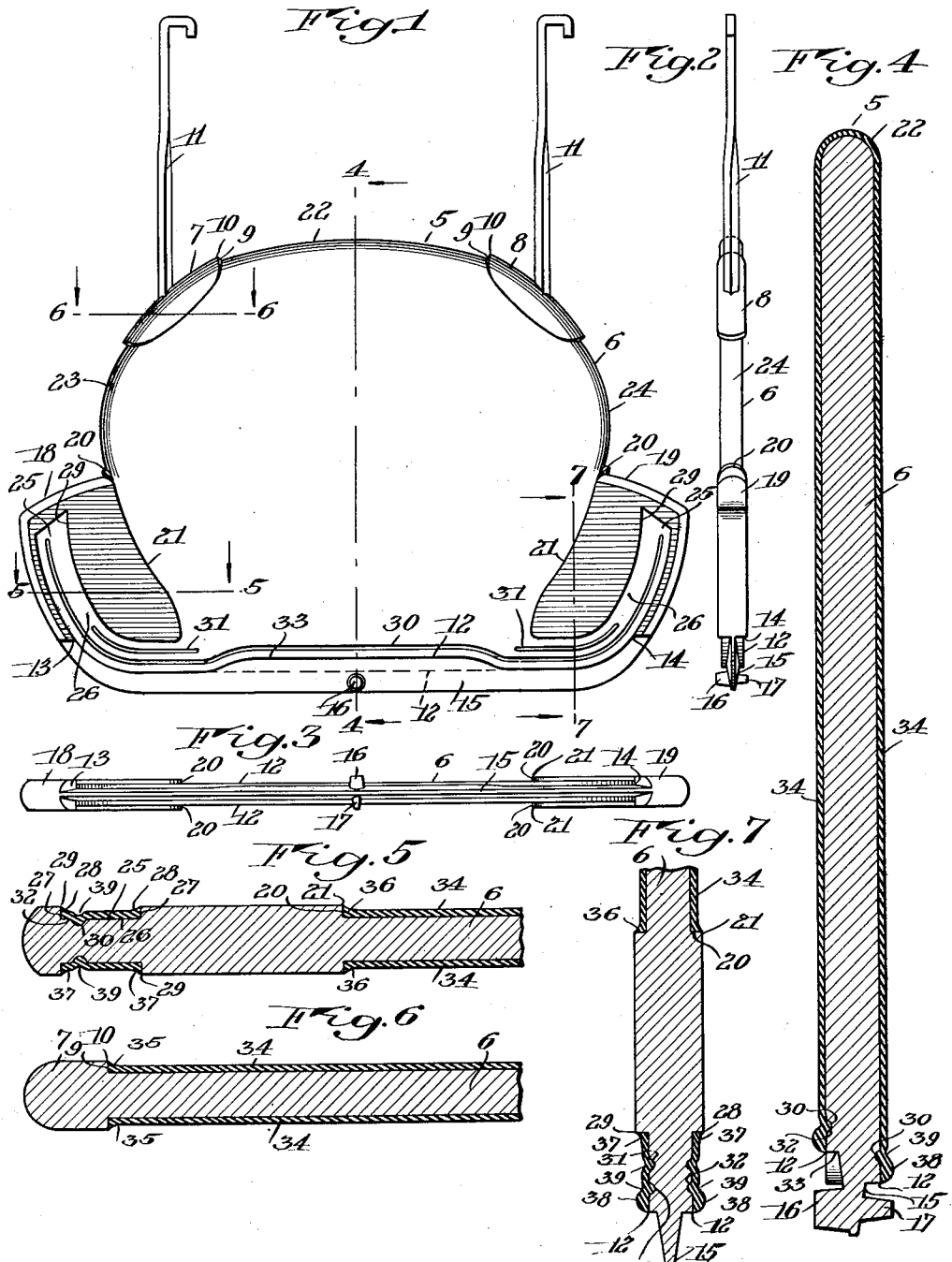
INVENTOR.
Abraham N. Spanel
BY D. Clyde Jones
his ATTORNEY.

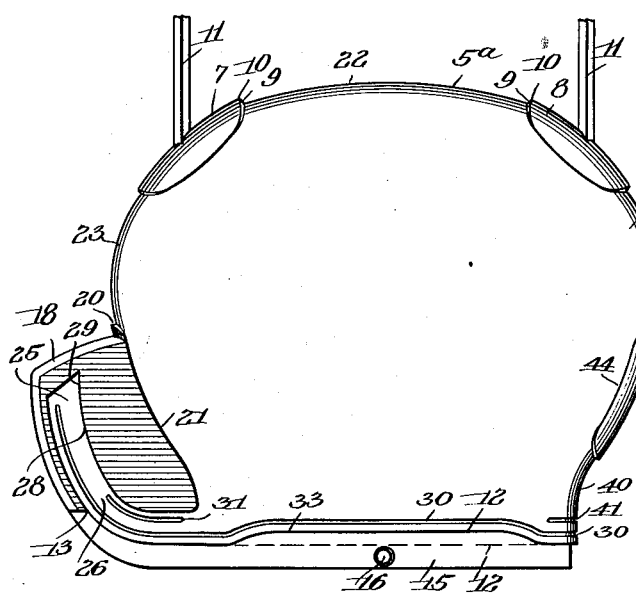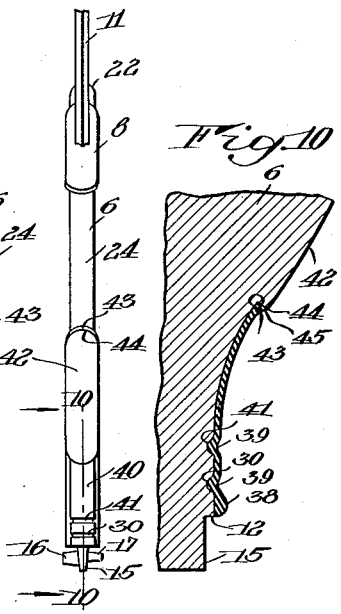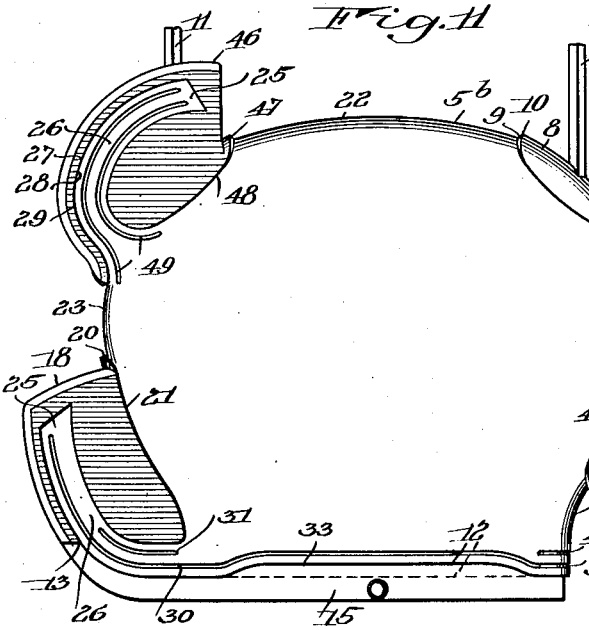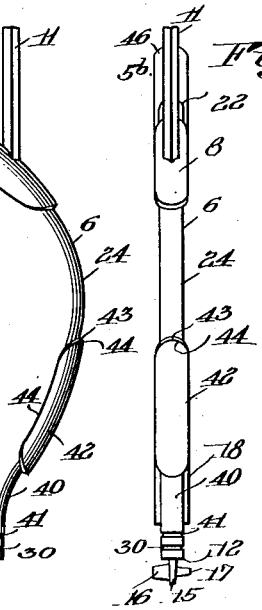

Aug. 27, 1940.  A. N. SPÁNEL  2,213,150
RUBBER GARMENT AND FORM FOR MAKING THE SAME
Filed Feb. 26, 1938   8 Sheets-Sheet 3
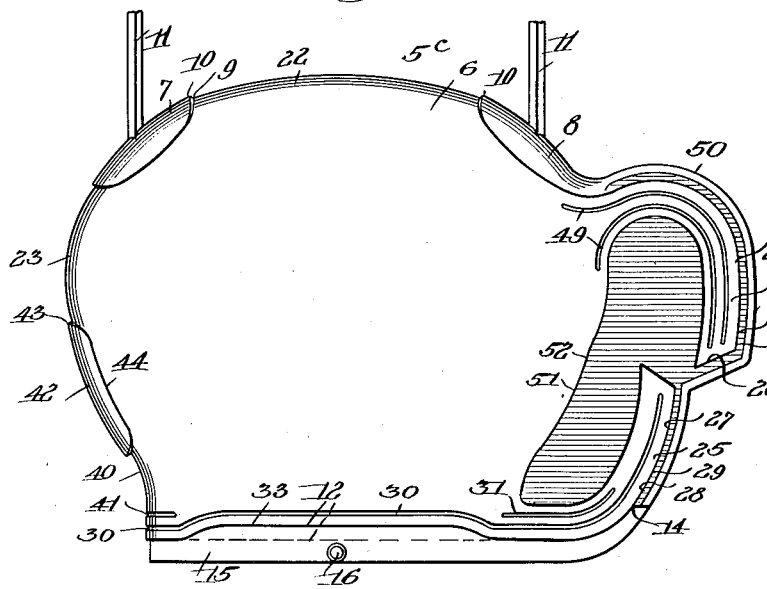
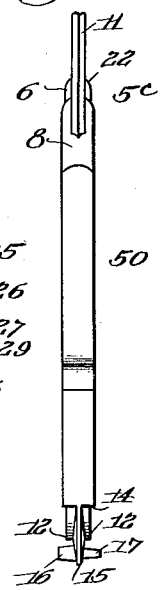
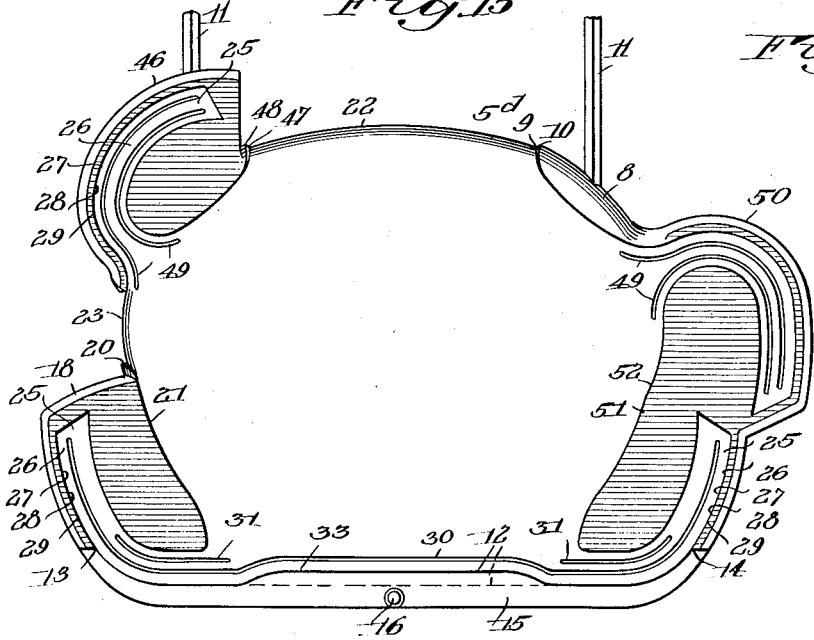
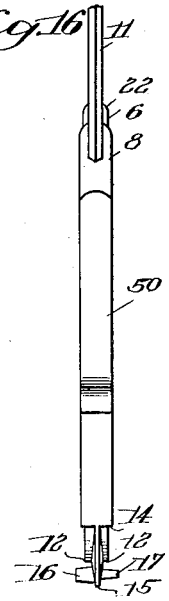
INVENTOR.
Abraham N. Spanel
BY D. Clyde Jones
his ATTORNEY.

Aug. 27, 1940.   A. N. SPÁNEL   2,213,150
RUBBER GARMENT AND FORM FOR MAKING THE SAME
Filed Feb. 26, 1938   8 Sheets-Sheet 4
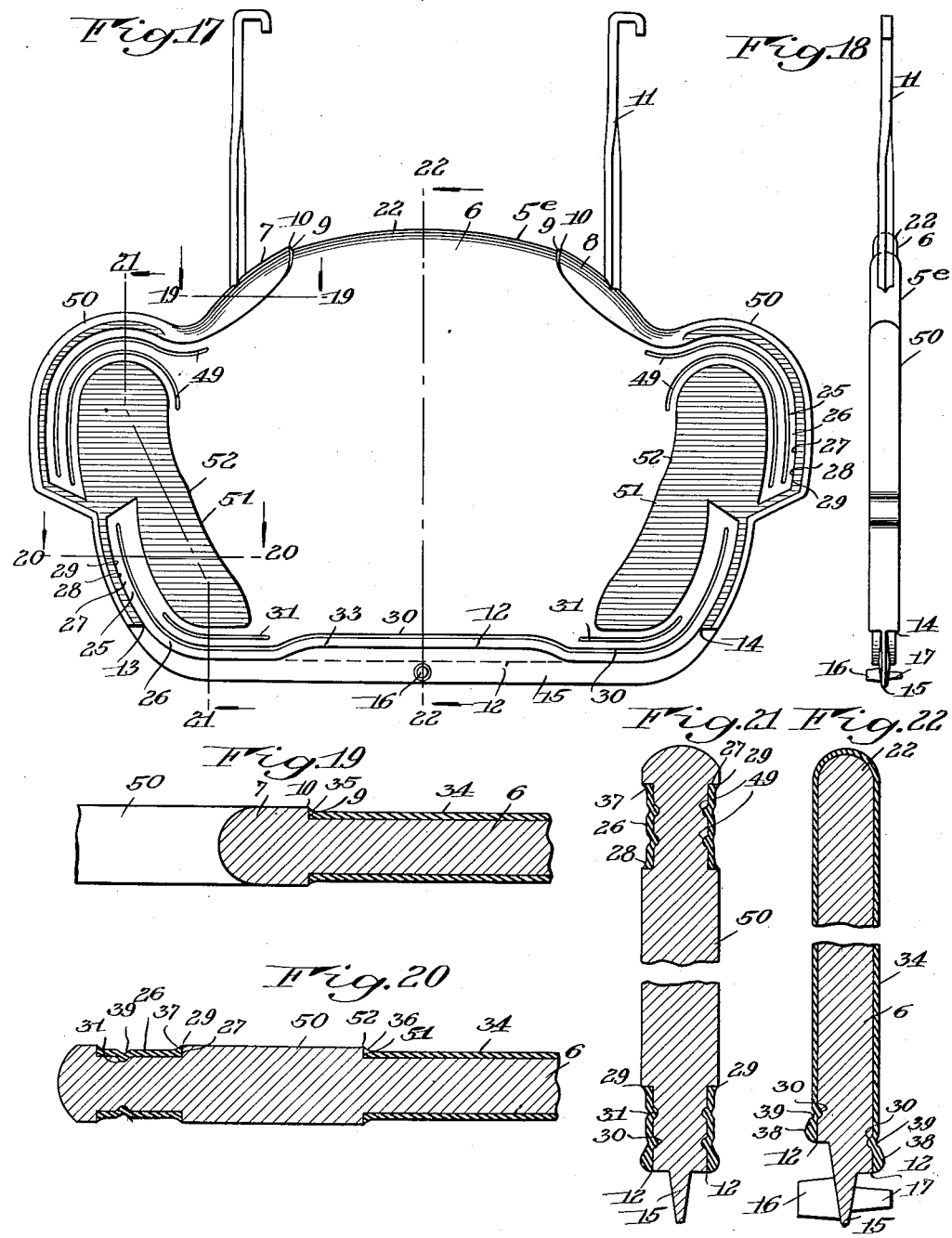
INVENTOR.
Abraham N. Spanel
BY
D. Clyde Jones
his ATTORNEY.

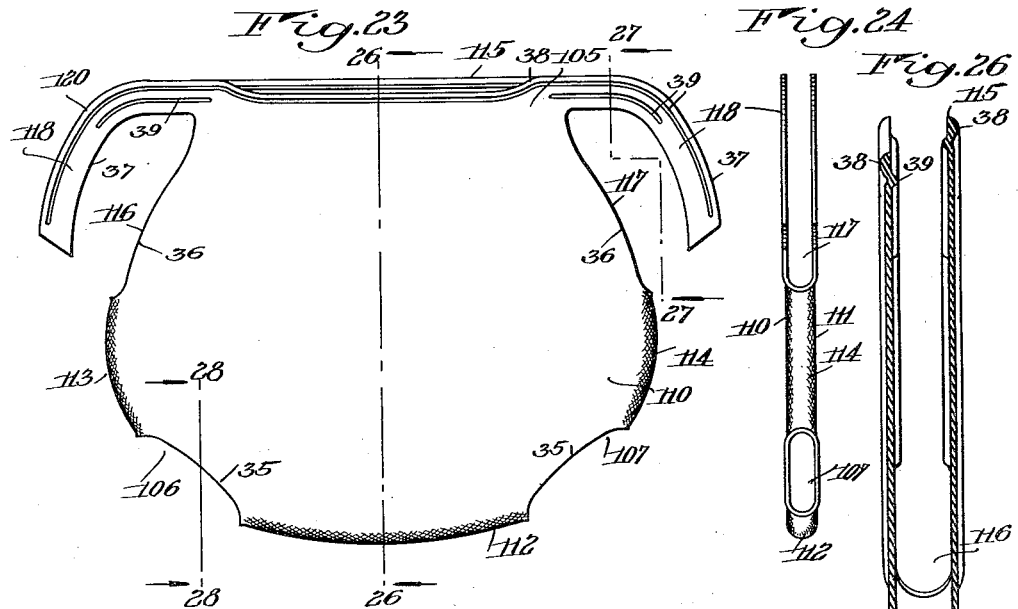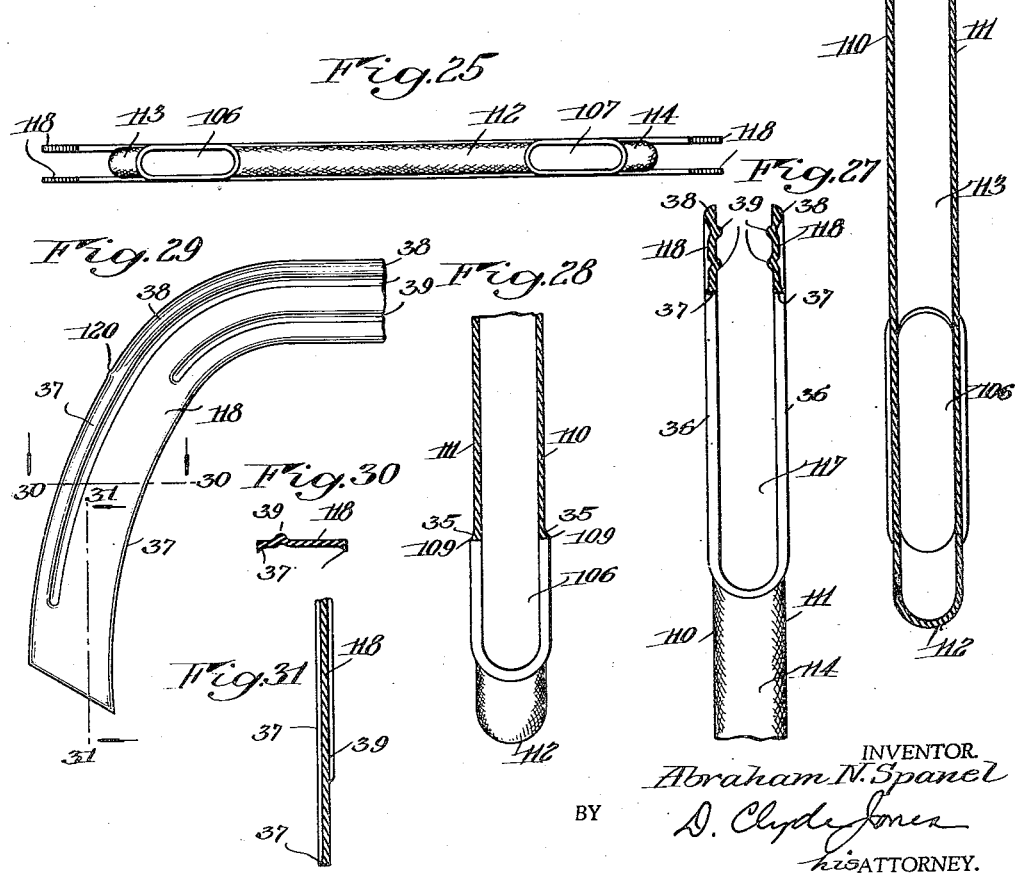

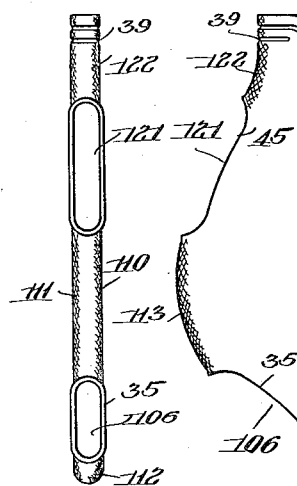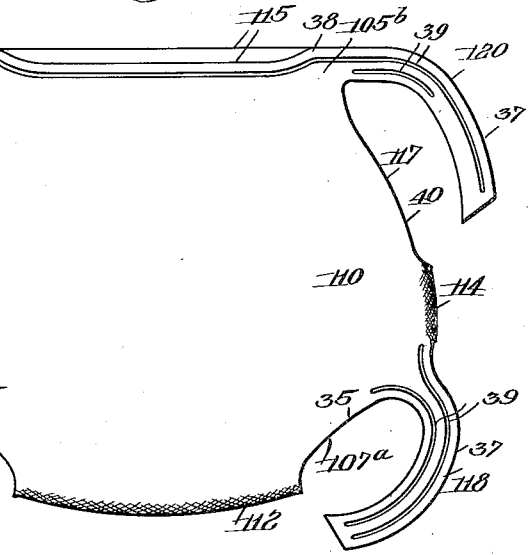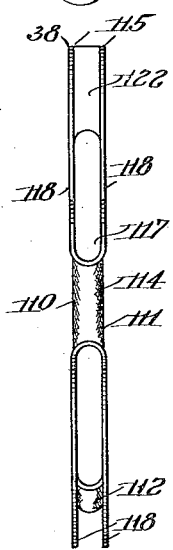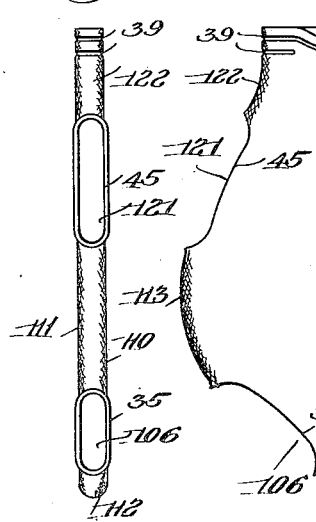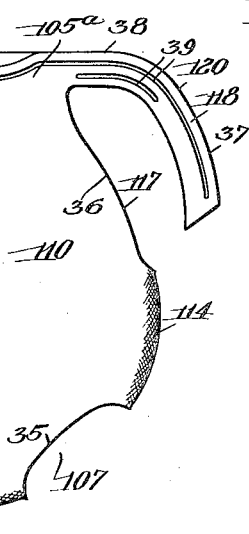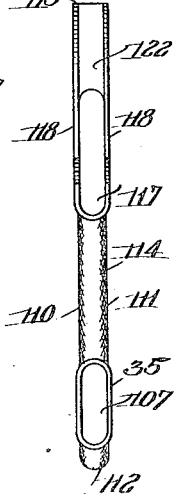

Aug. 27, 1940.  A. N. SPÁNEL  2,213,150
RUBBER GARMENT AND FORM FOR MAKING THE SAME
Filed Feb. 26, 1938  8 Sheets-Sheet 7
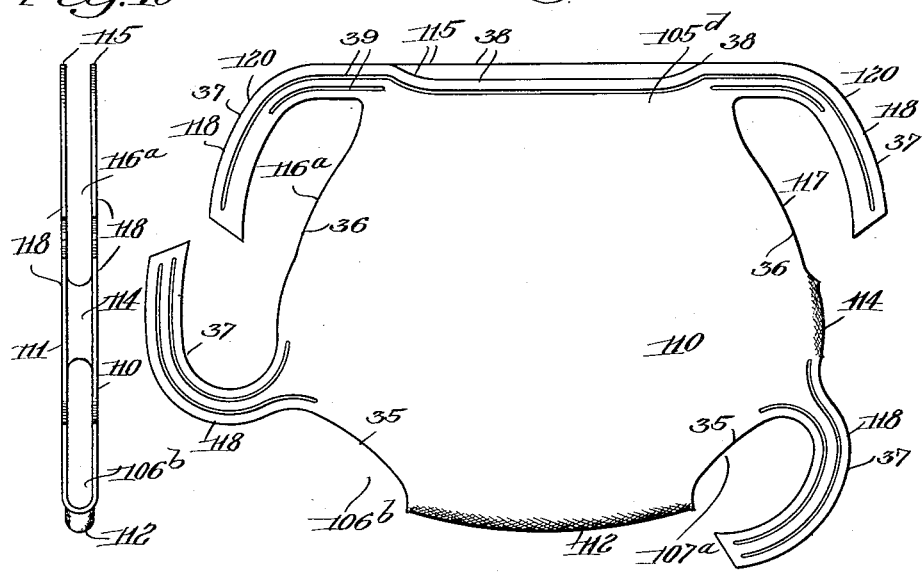
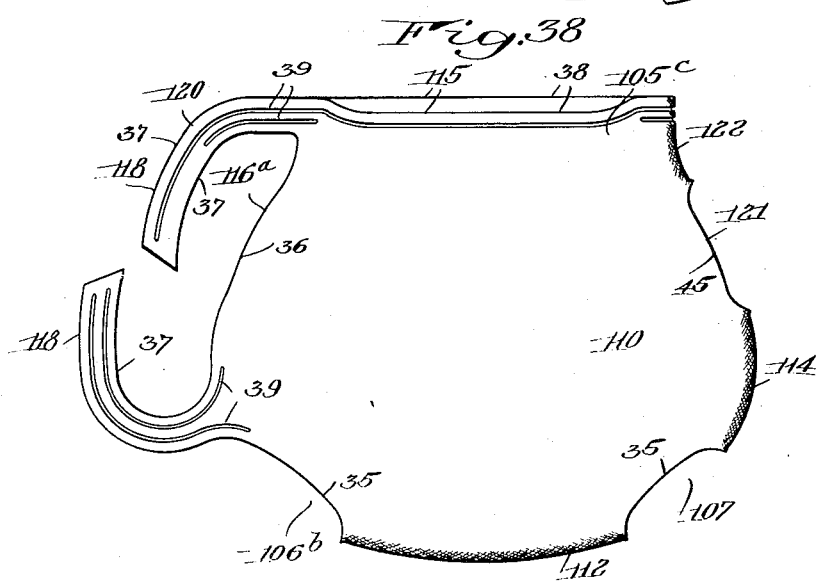
INVENTOR.
Abraham N. Spanel
BY D. Clyde Jones
his ATTORNEY.

Aug. 27, 1940.   A. N. SPÁNEL   2,213,150
RUBBER GARMENT AND FORM FOR MAKING THE SAME
Filed Feb. 26, 1938   8 Sheets-Sheet 8
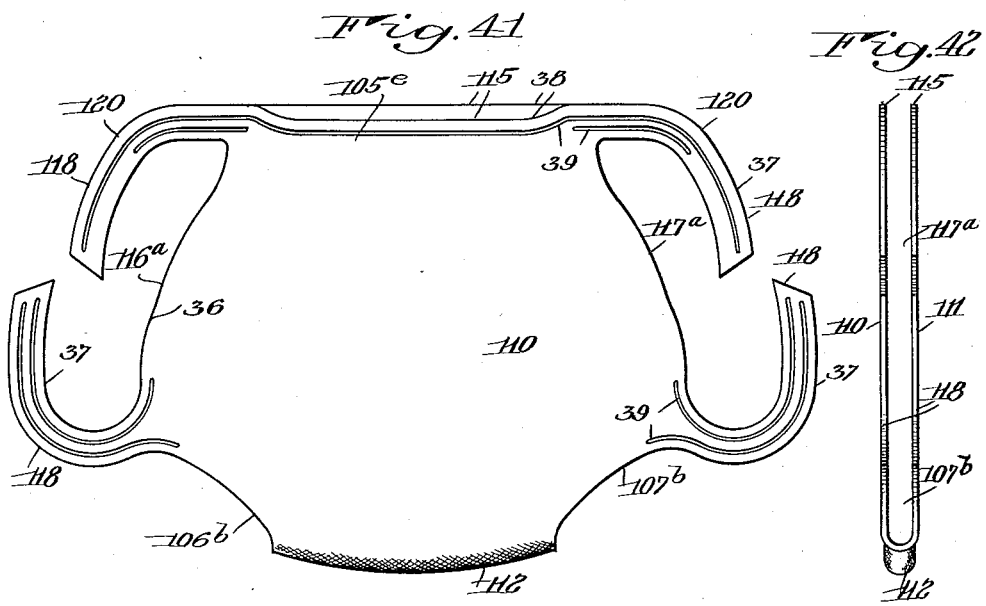
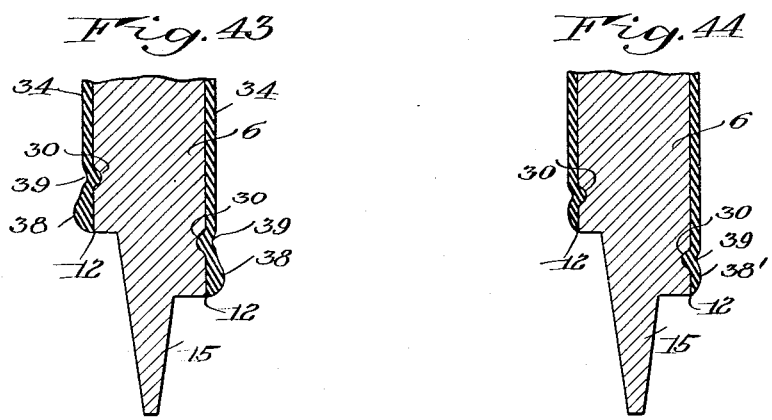
INVENTOR.
Abraham N. Spanel
BY D. Clyde Jones
his ATTORNEY.

Patented Aug. 27, 1940

2,213,150

UNITED STATES PATENT OFFICE 2,213,150

RUBBER GARMENT AND FORM FOR MAKING THE SAME

Abraham N. Spánel, Dover, Del.

Application February 26, 1938, Serial No. 192,745

10 Claims. (Cl. 18—41)

This invention relates to rubber garments and to forms for making the same.

The present invention represents an improvement over the invention disclosed in applicant's prior Patent #2,086,481 granted July 6, 1937, and is a continuation in part of applicant's copending application Serial No. 130,143, filed March 10, 1937.

Prior to the present invention, seamless deposited rubber pants had no provision for adjusting the size of the waist opening and the size of the leg openings since no means were known for producing integral one piece pants in which the above-mentioned openings could be adjusted by a means integral with the pants themselves. It is true that adjustable baby pants have been made heretofore, but they have always been made of a number of separate pieces sewn or otherwise secured together, with the result that numerous creases and pockets were formed at the junctions of the several pieces going to make up the pants, whereby dirt and the like readily lodged in the resulting creases and pockets rendering the pants unsanitary and difficult to clean.

Applicant has overcome all of the disadvantages of pants made of several pieces, in that he has provided a one piece garment which has no seams or joints in which dirt can lodge and has improved on his prior patent mentioned above, in that the pants may be adjusted to the wearer. It will be appreciated that in pants having leg and waist openings of fixed sizes, it is necessary to provide a large range of sizes to fit the infant as he grows older. As is well known, infants develop rapidly and it was found that they outgrew a pair of pants before the pants were worn out. Pants made in accordance with the present invention overcome this difficulty in that a given pair of pants may be worn for a longer period than heretofore possible, due to the adjustments provided at the waist and leg openings.

It is an object of this invention to provide a seamless deposited rubber garment having an adjustable waist and/or leg openings.

It is a further object of this invention to provide a seamless deposited rubber garment having tie strings integral therewith at the waist and/or leg openings.

It is a further object of this invention to provide a seamless deposited rubber garment having an interrupted waist margin provided with tie strings integral with the garment adjacent the interruption in the waist margin.

It is a further object of this invention to provide a form on which pants having tie strings integral therewith, may be made.

It is another object of this invention to provide a form on which there can be made a pair of pants having an interrupted waist margin, tie strings being formed integrally with the pants at the interruption of the waist margin.

These and other objects of the invention will appear from the detailed description and claims when taken with the drawings in which:

Fig. 1 is a face view of a form on which there can be made a pair of seamless rubber pants having pairs of tie strings on each side of the waist margin;

Fig. 2 is an edge view and

Fig. 3 is a bottom plan view of the form shown in Fig. 1;

Fig. 4 is a vertical section of the form shown in Fig. 1, taken on line 4—4 of that figure;

Fig. 5 is a fragmentary section taken on line 5—5 of Fig. 1;

Fig. 6 is a fragmentary section taken on line 6—6 of Fig. 1;

Fig. 7 is a fragmentary section taken on line 7—7 of Fig. 1;

Fig. 8 is a face view of a modified form on which pants, having tie strings at only one side of the waist margin, may be made;

Fig. 9 is an edge view of the form shown in Fig. 8;

Fig. 10 is a fragmentary vertical section taken on line 10—10 of Fig. 9;

Fig. 11 is a face view of a still further modified type of form on which a pants having tie strings at one side of the waist margin and tie strings at one of the leg openings, may be made;

Fig. 12 is an edge view of the form shown in Fig. 11;

Fig. 13 is a face view of a modified type of form on which a pants, having one of the leg openings communicating with the waist opening, may be made, means being provided on the form to generate integral tie strings at the leg opening region and waist opening region of the pants, at the side having the communicating leg and waist opening;

Fig. 14 is an edge view, looking from the right of the form shown in Fig. 13;

Fig. 15 is a face view of another type of form in which certain features of the form shown in Fig. 11 and in Fig. 13 are combined;

Fig. 16 is an edge view of the form shown in Fig. 15;

Fig. 17 is a face view of a still further modified type of form on which a pants having leg openings communicating with the waist opening may be made, means being provided on the form for generating tie strings on each side of the garment adjacent the waist opening and adjacent the leg openings;

Fig. 18 is an edge view of the form shown in Fig. 17;

Fig. 19 is a fragmentary section taken on line 19—19 of Fig. 17;

Fig. 20 is a fragmentary section taken on line 20—20 of Fig. 17;

Fig. 21 is a section taken on line 21—21 of Fig. 17;

Fig. 22 is a vertical section taken on line 22—22 of Fig. 17;

Fig. 23 is a front face view of a pair of pants made on the form shown in Fig. 1;

Fig. 24 is an edge view of the pants shown in Fig. 23;

Fig. 25 is a bottom plan view of the pants shown in Fig. 23;

Fig. 26 is a vertical section taken on line 26—26 of Fig. 23;

Fig. 27 is a sectional view taken on line 27—27 of Fig. 23;

Fig. 28 is a fragmentary section taken on line 28—28 of Fig. 23;

Fig. 29 is a detail view of one of the tie strings of the pants shown in Fig. 23;

Fig. 30 is a section taken on line 30—30 of Fig. 29;

Fig. 31 is a section taken on line 31—31 of Fig. 29;

Fig. 32 is a front face view of a pair of pants made on the form shown in Fig. 8;

Fig. 33 is an edge view, looking from the left, of the pants shown in Fig. 32;

Fig. 34 is an edge view, looking from the right, of the pants shown in Fig. 32;

Fig. 35 is a front face view of a pair of pants made on the form shown in Fig. 11;

Fig. 36 is an edge view, looking from the left, of the pants shown in Fig. 35;

Fig. 37 is an edge view, looking from the right, of the pants shown in Fig. 35;

Fig. 38 is a front face view of a pants made on the form shown in Fig. 13;

Fig. 39 is a front face view of a pants made on the form shown in Fig. 15;

Fig. 40 is an edge view, looking from the left, of the pants shown in Fig. 39;

Fig. 41 is a front face view of a pants made on the form shown in Fig. 17;

Fig. 42 is an edge view, looking from the right, of the pants shown in Fig. 1 and Figs. 43 and 44 are enlarged fragmentary sections taken through the waist-margin developing portions of the forms, illustrating alternative types of edge reinforcements obtained by varying the spacing of the groove from the lower abrupt edge.

Referring to Figs. 1 to 7 inclusive, there is shown a form generally indicated by reference character 5, on which there can be made a pair of seamless pants having leg openings and a waist opening. The margin of the resulting pants, at the waist opening, will be interrupted at each side and will have tie strings formed integral therewith which can be tied to adjust the size of the waist of the pants. The form 5 as well as the other forms to be described later, may be made of metal, glass, porcelain or any other suitable material on which rubber may be removably deposited. However, it is preferred to make the form of aluminum.

The form 5 comprises a flattened body portion 6 having substantially the outline of the desired pants, provided with two spaced raised leg-opening defining bosses 7 and 8 on the upper margin thereof. Each boss projects abruptly from the surface of the form as shown in Figs. 1, 2 and especially Fig. 6, to define a recess 9 at the junction of the edge of the boss with the surface of the body portion. The face of each boss terminates in an abrupt edge 10. A pair of supports or hangers 11 preferably project from the bosses 7 and 8.

The lower end of each face of the body portion 6 terminates in an abrupt edge 12 which abrupt edges extend from the point 13 to the point 14. As shown more clearly in Figs. 4 and 7, a narrow depending fin 15 disposed below the abrupt edge 12, carries the pins 16 and 17 projecting at right angles to the principal plane of the form. It will be appreciated that a plurality of forms will be mounted on a suitable dipping rack (not shown) by means of supports 11 so that a corresponding number of pants may be made simultaneously. For economy in dipping space, these forms when dipped, are mounted as closely together as possible, the pins 16 and 17 acting as spacing means to prevent the bodies of the forms from contacting each other.

The laterally projecting extensions 18 and 19 on the lower part of the sides of the body portion preferably constitute an integral part of the form 5. The extensions 18 and 19 are slightly thicker than the flattened body portion 6, to provide the recesses 20 which terminate in abrupt edges 21. As shown particularly in Fig. 4, the opposite faces of the form 6 are joined by a smoothly curved portion 22 between the bosses 7 and 8, while these faces are similarly joined by smoothly curved portions 23 and 24 between boss 7 and the projecting portion 18, and the boss 8 and the projecting portion 19 respectively.

In order to generate tie strings integral with the pants, each face of the extensions 18 and 19 is provided with a channel 25. Each channel has the outline of the desired tie string and the bottom surface 26 thereof (Fig. 1) is preferably in the plane of the adjacent face of the form and in any event smoothly merges with the adjacent face of the form. The lateral wall 27 of each channel 25 defines a recess 28 with the bottom surface 26 of the channel and terminates in an abrupt edge 29. The abrupt edges 12 of the body portion are continued to a lateral wall of the channels 25 as indicated at 13 and 14. Each face of the body portion 6 may be provided with a groove 30 substantially parallel with and spaced from the lower abrupt edge 12. These grooves preferably continue along the bottom surfaces 26 of each channel 25 and if desired, other grooves 31 spaced from the first-mentioned grooves 30 may also be provided in the bottom surface of each channel. All of the grooves merge gradually with the surface of the form as indicated at 32 so that there will be no abrupt edge at the intersection of the groove surface and the adjacent form surface.

It will be noted that the abrupt edge 12 is slightly elevated at the front of the form, as indicated at 33, with relation to the abrupt edge 12 at the back of the form so that the front edge of the resulting pants at the waist opening will be offset with respect to the rear edge at this opening. Except for this difference the form will have substantially the same appearance when viewed from either face.

A clearer understanding of the structure just described may be had from a description of the manner of using the form. As previously mentioned, the form is suspended from a suitable dipping rack by means of the supports 11. The dipping rack is next lowered to immerse the form in a bath of rubber, preferably an aqueous dispersion of rubber, such as latex. The form is then withdrawn from the bath and the rubber deposited on the form is permitted to "set." If it is desired to obtain a thicker coating of rubber, the form may be dipped again, one or more times, allowing a "setting time" or drying interval between each dip. The rubber will be deposited as a substantially uniform layer 34 over the entire form except that above the lower abrupt edge 12 and in the various recesses and grooves previously described, the rubber will accumulate to provide thickened ridges of rubber serving as reinforcements for the margins of the resulting pants. At the abrupt edges of the form, lines of weakness will be developed in the layer of deposited rubber thereby permitting easy separation, as by tearing, of the waste rubber from the article proper.

In Figs. 4, 5, 6 and 7, reference character 34 indicates the layer of rubber deposited on the form. In these views the excess or waste rubber deposited over the bosses, the extensions, and the lower end of the form has been omitted, the form being shown after the rubber layer has been trimmed away. It will be seen that in the recesses 9, formed by the bosses 7 and 8 with the surface of the body portion of the form, the rubber accumulates as a thickened angular reinforcement 35 for the margin defining the leg openings of the pants. The rubber also accumulates in the recesses 20 defined by the raised extensions 18 and 19 to provide similar thickened angular reinforcements 36 for the margin defining the side openings in the pants. The rubber also accumulates in the recesses 28 below the abrupt edges 29 of the channels 25 to provide integral angular reinforcements 37 for the edges of the tie strings developed in these channels. The rubber accumulates above the abrupt edges 12 and in the grooves 30 and 31 as thickened beads of rubber 38 and 39 respectively to give additional strength to the waist margin and to the tie strings of the resulting pants. It will be noted that the angular reinforcements 37 will be continuous with the angular reinforcement 36, and will merge with the reinforcing ridges 38 at the points 13 and 14.

The rubber overlying the fin 15 and the faces of the bosses 7 and 8 and the lateral extension 18 and 19 is readily stripped away to the lines of weakness developed in the rubber layer at the abrupt edges 10, 12, 21 and 29. After the excess rubber has been stripped away, there remains a seamless one-piece pants having a pair of leg openings, and an interrupted waist margin providing in effect, ventilating openings at the sides of the pants, while at each side of the waist margin interruptions there is provided a tie string integral with the pants permitting the pants to be adjusted about the wearer's waist. All of the margins of the pants are integrally reinforced by ridges of deposited rubber and in addition the body of the tie strings are additionally reinforced by the resulting ribs of rubber accumulated in the grooves 30 and 31 to give added strength. It will be understood that the pants may be vulcanized either before or after removal from the form. If a prevulcanized aqueous dispersion of rubber is used, the deposited rubber need only be dried.

Referring to Figs. 8, 9 and 10, there is shown a slightly modified form 5a, on which there can be deposited a pair of seamless pants having leg openings and a waist opening therein. The pants made on this form will differ from those made on the form 5 (Fig. 1) in that the margin at the waist-opening is interrupted at only one side of the pants. A tie string is formed integrally with the pants at each side of the interruption in the waist margin. Since many of the elements of form 5a are identical with elements on the form 5, similar reference characters will be used to identify the corresponding elements.

Thus, form 5a comprises a body portion 6 having a pair of spaced raised bosses 7 and 8 providing the recesses 9 at their junction with the surfaces of the body portion 6. The face of each of the bosses 7 and 8 terminates in an abrupt edge 10 above the recesses. The supports 11 which project upwardly from the bosses, have been shown only fragmentarily, since their structure will be clear from an inspection of Fig. 1. The lower end of each face of the body portion 6 terminates in an abrupt edge 12 which at the front is slightly elevated or offset with relation to the back as indicated at 33.

It will be noted that a tie-string and side-opening forming extension 18 has been provided on only one side edge of the body portion 6 of the form 5a. The front and rear faces of the body portion 6 curve into each other, at the side opposite the extension 18 as indicated at 40. It will thus be seen that the lower abrupt edge 12 is continuous from the point 13 on the front face of the form to a corresponding point on the rear face of the form.

As in the case of the form 5 shown in Fig. 1, the laterally projecting extension 18 is slightly thicker than the body portion 6 to provide a recess 20, the surface of the extension terminating in an abrupt edge 21 above this recess. A tie-string forming channel 25 is formed in each face of the extension 18, the bottom surface 26 of each channel smoothly merging with the adjacent face of the body portion 6. The lateral wall 27 of each channel defines a recess 28 with the bottom surface 26 of the channel, and terminates in an abrupt edge 29 above the recess. Each channel is provided with a groove 30 smoothly rounded in cross section, which groove extends adjacent one wall of the channel and continues along the face of the body portion 6 substantially parallel to but spaced from the abrupt edge 12. The channels may each be provided with a second groove 31, spaced from the groove 30, while a second groove 41 may be provided in the curved edge portion 40 of the form.

The raised boss 42 projects abruptly from the edge of the body portion opposite the lateral extension 18. This boss defines a recess 43 with the adjacent surface of the body portion and terminates in an abrupt edge 44, to generate a ventilating opening, defined by a reinforced margin, in the resulting pants.

The form 5a is adapted to be coated with rubber in the same manner as form 5. The rubber will be deposited in a substantially uniform layer over the body portion 6, while in the recesses 9, 20, 28 and 43 the rubber will accumulate to provide thickened reinforcements 35, 36, 37 and 45 for the margins of the resulting pants. The latex will also accumulate above the abrupt edge 12 and in the grooves 30, 31 and 41 to provide thickened reinforcements 38 and 39 in the rubber layer to afford additional strength at the waist margin and at the tie strings of the pants. Lines of weakness will be developed in the rubber layer at the abrupt edges 10, 12, 21, 29 and 44 whereby the excess rubber overlying the bosses 7, 8 and 42 and the raised portions of the extension 18 and over the fin 15 at the bottom of the form may be readily stripped away to the mentioned lines of weakness.

In Figs. 11 and 12 there is shown a form 5b similar to the form 5a in that a tie-string forming extension has been provided at only one side of the form. However, this form 5b differs from the previously described forms in that one of the leg opening forming bosses 7 has been replaced by a tie-string and leg opening forming extension 46. The pants made on this form in addition to having an adjustable waist band as in the case of the pants made on the previously described forms 5 and 5a, will be adjustable by means of the tie strings at an enlarged leg opening in order to obtain a more perfect fit of the pants on the wearer.

Like form 5a, the form 5b comprises a flattened body portion 6, in which the lower end of each of the faces terminates in an abrupt edge 12. This edge 12 extends from the point 13 around the bottom of the form to a corresponding point on the opposite face of the body portion. The side opening and tie-string forming extension 18 projecting from one side of the form, is slightly thicker than the body portion to define a recess 20 with the adjacent surface thereof. The surface of the extension 18 terminates in an abrupt edge 21 above the mentioned recess 20. A channel 25 is formed in each face of the extension and the bottom surfaces 26 thereof merge smoothly with the adjacent face of the body portion 6. A groove 30 is formed in the bottom surface of each of the channels and extends around the bottom of the form substantially parallel to and spaced above the lower abrupt edge 12. A second groove 31 may be provided in the bottom surface of each of the channels 25, and if desired, a groove 41, may be provided about the curved portion 40 of the form.

A raised boss 42 for generating a ventilating opening in one side edge of the resulting pants, projects abruptly from the edge of the body portion 6 opposite the lateral extension 18 and defines a recess 43 with the adjacent surface of the body portion. The surface of the boss 42 terminates in an abrupt edge 44 above the recess 43. The leg-opening defining boss 8 projects abruptly from the upper portion of the body portion 6 and defines a recess 9 with the adjacent surface of the body portion. The surface of this boss like that of the boss 42 terminates in an abrupt edge 10. The structure just described is identical with that of the form 5a.

In lieu of a boss 7 however, there is provided a leg-opening and tie-string forming extension 46 which is slightly thicker than the body portion 6 to define a recess 47 with the adjacent surface of the body portion. The extension 46 terminates in an abrupt edge 48 above the recess 47. A channel 25 is formed in each face of the extension, the bottom surface 26 of each channel smoothly merging with the adjacent face of the body portion 6. The lateral walls 27 of each of the channels 25 define recesses 28 with the bottom surfaces of the channels, and terminate in an abrupt edge 29 where they join the surface of the extension 46. Rounded reinforcement-generating grooves 49 may be provided in the bottom surface 26 of each of the tie string forming channels to add additional strength to the tie strings deposited in the channels. Suitable supports or hangers 11 project upwardly from the extension 46 and the boss 8.

The form 5b is adapted to be used in the same manner as the forms 5 and 5a and the procedure of coating and trimming the form need not again be repeated, it being understood that the rubber will accumulate above the abrupt edge 12 and in the various recesses and grooves to provide thickened reinforcements while at the abrupt edges, lines of weakness will be developed in the deposited rubber permitting ready separation of the waste rubber overlying the raised portions of the extensions and the surfaces of the bosses 8 and 42. The extension 46 defines an enlarged leg opening in the pants, and also generates tie-strings integral with the pants whereby the leg opening may be adjusted.

In Figs. 13 and 14 there is shown a form 5c which is similar to the form 5b of Fig. 11 in that pants, having tie-strings at one leg opening and at one side of the waist opening may be made. However, the form 5c differs from the form 5b in that the leg opening of the pants made thereon, at the side having the tie-strings, communicates with the waist opening. The form 5c comprises a flattened body portion 6 having a pair of spaced leg-opening defining bosses 7 and 8 affording recesses 9 with the adjacent surface of the body portion. The faces of the bosses terminate in abrupt edges 10 above the recesses 9. Supports 11, shown only fragmentarily in Figs. 13 and 14, projects upwardly from the bosses. The left side of the form as viewed in Fig. 13 is also provided with a ventilating opening defining boss 42 providing a recess 43 with the adjacent surface of the body portion, the surface of the boss terminating in an abrupt edge 44 above the recess.

On the edge of the form opposite the boss 42 there is provided a broad lateral extension 50 slightly thicker than the body portion 6. The extension 50 defines a recess 51 with the adjacent surface of the body portion 6 and terminates in an abrupt edge 52 above this recess. The opposite faces of the extension 50 are each provided with a pair of channels 25 for the purpose of generating tie strings which will be integral with the body of the resulting pants, one pair of tie strings being formed adjacent the waist margin and the other pair adjacent one end of the leg opening. It will be seen that the boss 8 merges with the lateral extension 50 whereby the leg opening in the pants made on this form will communicate with the waist-opening. The bottom surfaces 26 of the channels 25 smoothly merge with the adjacent faces of the body portion 6. The lateral walls 27 of each of the channels define recesses 28, and terminate in abrupt edges 29 above these recesses. If desired, the form may be grooved as at 30, 31, 41 and 49 in order to generate thickened ridges of latex in the layer of rubber deposited on the form as heretofore described. The lower end of the body portion 6 terminates in the abrupt edge 12, continuous from the point 14, where it joins the lateral wall 27 of the channel 25, to a corresponding point on the other face of the form.

On coating the form 5c with latex or the like, a uniform layer of rubber will be deposited over the body portion 6 while in the recesses 9 and 43, and above the abrupt edge 12 the rubber will accumulate to provide thickened angular reinforcements for the margins defining the leg, ventilating and waist openings while lines of weakness will develop at the abrupt edges 10, 12 and 44. The latex will also accumulate in the recesses 28 of the channels 25 and in the recess 51 defined by the extension 50 to provide thickened marginal reinforcements for the tie strings and the open side of the pants. The rubber also accumulates in the grooves 30, 31, 41 and 49 to provide additional reinforcements for the pants. It will be seen that the pants deposited on this form will have one leg opening communicating with the waist opening, which opening is closed by tying the tie strings at the leg opening and at the waist margin.

The form 5d shown in Figs. 15 and 16 combines the features of forms 5b and 5c shown in Figs. 11 and 13 respectively. On this form there can be made a pair of seamless pants having pairs of tie strings at each side of the waist opening and at each leg opening, one of the leg openings being open to the waist opening. The right side of the form 5d as viewed in Fig. 15, is identical with the right side of form 5c as viewed in Fig. 13. The lateral extension 50 will generate a long lateral opening in the corresponding side of the pants deposited thereon, tie strings being formed integrally therewith at the waist margin and at the leg opening. The left side of the form 5d as viewed in Fig. 15 is identical with the left side of the form 5b as viewed in Fig. 11 whereby the corresponding side of the pants made thereon will be closed between the opening formed adjacent the waist-margin tie strings and the tie strings at the leg opening. Since the specific structure of the form 5d will be clear from the detailed description of the elements on the left and right sides o fthe forms 5b and 5c respectively, it is unnecessary to repeat the description here. The elements of the form 5d have been identified by the same reference characters applied to the corresponding elements of forms 5b and 5c.

In Figs. 17 to 22 there is illustrated a form 5e similar to the form 5c shown in Fig. 13. However, since a side opening and tie-forming extension 50 has been applied to each of the side edges of the body portion 6 of the form 5e, each leg opening of the pants made on the form 5e will communicate with the waist opening. The open sides of the resulting pants will be adjusted about the wearer's legs and waist by means of the tie-strings formed integrally with the pants. Since the form 5e is the same as form 5c except that the bosses 7 and 42 of form 5c have been replaced by a broad extension 50, the specific structure of form 5e will be clear from the detailed description of the form 5c. The same reference characters have been applied to the various elements of the form 5e in Figs. 17 to 22 inclusive which were used to indicate the corresponding elements of the form 5c.

In Figs. 23 to 31 inclusive, reference character 105 generally indicates a pair of seamless, deposited rubber pants made on the form 5 illustrated in Figs. 1 to 7 inclusive. The leg openings 106 and 107 of the pants are defined by margins having thickened angular reinforcing ridges of rubber 35 integral therewith, the ridges terminating in a thin torn edge 109. The front and rear walls 110 and 111 respectively of the pants are integrally joined between the leg openings 106 and 107 to provide a curved closed crotch 112 and are also integrally joined at the sides as indicated at 113 and 114. The waist margin 115 is interrupted at each side providing the side openings 116 and 117. The tie strings 118 are formed integral with the pants, one being provided at each side of each of the side openings 116 and 117. The margins defining the side openings 116 and 117 and the margins of the tie strings 118 are integrally reinforced by continuous thickened angular ridges of rubber 36 and 37 respectively. The reinforcements 37 merge at 120 (Fig. 29) with the integral reinforcements 38 provided along the upper margins of the front and back walls 110 and 111 of the pants. As more clearly shown in Figs. 26 and 27, the integral reinforcement 38 is semi-pear shaped in cross-section and merges with the thickened ridge of rubber 39 adjacent the edge of the waist margin. The reinforcing ridges 39 extend along the waist margins and along one margin of each of the tie strings to increase the strength thereof. If desired, a second ridge 39 may be provided in each tie string adjacent its junction with the body of the pants since it is at this point that the greatest strain is likely to occur when the strings are tied.

From the above construction, it will be seen that there has been provided a pair of seamless deposited pants which may be easily applied and removed from the infant due to the greatly enlarged waist opening and that the size of the waist opening may be readily adjusted to suit the wearer by suitably tying adjacent pairs of tie strings. Another advantage arises from this construction since the tie strings may be untied to allow the pants to be opened so that the infant's diaper may be removed and replaced without the necessity of entirely removing the garment as has heretofore been necessary where the margin of the waist band has not been adjustable.

The pants 105a illustrated in Figs. 32 to 34 inclusive have been made on a form like that shown in Fig. 8. These pants 105a are similar to the pants 105 except that the waist margin is interrupted at only one side and only one pair of tie strings has been provided. A ventilating opening 121 is provided in the side of the pants opposite the side opening 117, the margin defining the ventilating opening being reinforced by an integral angular ridge of rubber 45 similar to the ridge 35 on the margins defining the leg openings 106 and 107 shown in detail in Fig. 28. The front and rear walls 110 and 111 of the pants 105a are integrally joined between the ventilating opening 121 and the waist margin 115, as indicated at 122, and if desired this portion of the pants may be provided with a second short integral thickened ridge of rubber 39. Except for the structure just mentioned, the pants 105a are identical with the pants 105, and the several margins are integrally reinforced in the same manner.

In Figs. 35, 36 and 37, there is shown a pair of modified seamless pants 105b which can be made on a form similar to that illustrated in Fig. 11. The pants 105b comprise the front and rear walls 110 and 111 integrally joined at the crotch 112 and at the sides 113 and 114. A leg opening 106 defined by an integrally reinforced margin 35 is provided at one side of the crotch. At the other side of the crotch, the enlarged leg opening 107a defined by an integrally reinforced margin 35 is adapted to be adjusted by means of the tie strings 118 integral with and projecting from the reinforced margin 35 of the opening 107a. The margin defining the leg opening 107a and the margin of the tie strings 118 are reinforced by continuous angular ridges of rubber 35 and 37 integral with the body of the pants and if desired, thickened ridges of rubber 39 may be provided in the body of the tie strings to increase the strength thereof. As in the case of the pants 105a there is provided a ventilating opening 121 defined by an integrally reinforced margin 45. The reinforcement 45 comprises an integral angular ridge of rubber similar to the reinforcement 35. The waist margin 115 is closed or continuous above the ventilating opening 121 as indicated at 122, while at the opposite side edge of the pants, the waist margin is interrupted to provide the side opening 117, tie strings 118 being formed integrally with the pants at each side of the side opening 117. The margin defining the side opening 117 and the margins of the tie strings 118 are integrally reinforced by continuous angular ridges of rubber 36 and 37 which merge at approximately the point 120 with the integral reinforcement 38 on the waist margin 115 of the pants, as more clearly illustrated in Fig. 29. The tie strings and the waist margin of the pants may be additionally reinforced by integral ridges of rubber 39.

It will be seen that the pants 105b may be adjusted about the waist of the wearer by tying the strings 118 at the waist margin, and that the pants may also be adjusted by means of the tie strings 118 at the leg opening 107a. The tie strings 118 at the leg opening 107a serve not only to adjust the size of the leg opening but may also be adjusted to reduce any excess fullness of the pants between the upper ends of the leg openings.

The pants 105c illustrated in Fig. 38, can be made on the form shown in Fig. 13 and comprise a seamless deposited pants having a pair of leg openings 106b and 107, the margins of which are integrally reinforced by angular ridges of rubber 35. The leg opening 106b communicates with the waist opening of the pants to provide an open side 116a. This leg opening is adjustable by means of the tie strings 118, which are integral respectively with the front and rear walls of the pants, while the waist opening is adjustable by means of a pair of strings 118 likewise integral with the front and rear walls respectively of the pants at the waist margin 115. The tie strings 118 and the margin defining the open side 116a, are integrally reinforced by continuous angular ridges of rubber 37 and 36 respectively, while the margin 115 defining the waist opening, is reinforced by a ridge of rubber 38 which merges at the point 120 with the angular ridge of rubber 37. As in the pants previously described, integral ridges of rubber 39 may be provided in the several tie strings and along the waist margin of the pants to afford additional strength to the garment.

The pants 105d (Figs. 39 and 40) can be made on the form 5d shown in Fig. 15 and comprise front and rear walls 110 and 111 respectively, integrally joined at the crotch 112 and at one side 114, the opposite side edge of the pants being open from the leg opening 106b to the waist margin 115. Pairs of tie strings 118 integral with the front and rear walls 110 and 111 respectively, are provided at each side of the pants, one pair being disposed adjacent the waist margin 115 at the side opening 117 and another pair being disposed adjacent the waist margin 115 at the open side 116a, while similar pairs of tie strings are provided at each of the leg openings of the pants. The margins of the pants and tie strings are all integrally reinforced, in the same manner as the pants previously described.

In Fig. 41 there is shown a pair of pants 105e which can be made on the form 5e illustrated in Fig. 17. These pants have a closed crotch 112 but are open at the sides as indicated at 116a and 117a. The sides of the pants are adapted to be closed by means of the pairs of tie strings 118 formed integrally with the front and rear walls 110 and 111 respectively adjacent the waist margin of the pants, and the pairs of tie strings 118 integral with the margins at the sides of the pants, in spaced relation to the closed crotch to provide adjustable leg openings 106b and 107b. The margins of the pants are integrally reinforced by ridges of rubber as will be understood from the description heretofore set forth.

Figs. 43 and 44 illustrate two alternative types of integral edge reinforcements obtainable at the waist margin of the deposited pants by varying the spacing of the groove 30 from the abrupt edge 112. Fig. 43 represents an enlarged fragmentary section taken through the lower edge of the form 5 illustrated in Fig. 1. In this figure, it will be noted that the grooves 30 are spaced a sufficient distance above the lower abrupt edges 12 of the body portion 6 of the form to allow the deposited rubber to accumulate above the abrupt edges as a thickened ridge 38, which is semi-pear shaped in cross-section, while a thickened ridge 39 of rubber will accumulate in the groove 30. In the modified construction shown in Fig. 44, the grooves 30 are disposed closely adjacent the abrupt edges 12 whereby a much samller semi-pear shaped ridge 38' is obtained, this ridge merging with the thickened ridge of rubber which accumulates in the groove 30. By placing the groove 30 closely adjacent the abrupt edge 12 as shown in Fig. 44, a very thin or membranous section of rubber will be deposited over the abrupt edge 12 whereby the rubber layer deposited over the fin 15 may be readily stripped or torn away. It will be understood that any of the forms herein disclosed may be made in accordance with the construction disclosed in either Fig. 43 or 44.

While it is preferred to make the various pants disclosed herein, of latex by deposition from an aqueous dispersion of rubber, any other material having like characteristics may be employed.

It will be understood that the invention is not to be limited to the described manner of coating the forms with rubber, that is, by dipping the forms in a bath of latex, since it is within the perview of the invention to deposit the rubber by spraying, or acid coagulation, and the like.

While preferred types of integral edge reinforcements have been disclosed, it will be obvious to those skilled in the art that certain of the margins of the pants may be integrally reinforced as by folding certain of the edges and cementing or otherwise securing the folded edge.

Altho several embodiments of the invention have been disclosed, it will be understood that this invention is capable of still further modifications and that this disclosure is intended to cover any variations, uses or adaptations of the invention falling within the scope of the appended claims.

What I claim is:

1. Seamless deposited rubber pants having a pair of spaced leg openings and a waist opening, the margins defining said openings being strengthened by reinforcements of rubber integral therewith, one of said leg openings communicating with said waist opening to provide an open side in the pants, a plurality of pairs of tie strings formed integrally with the body of the pants, one pair of said tie strings being disposed adjacent the waist margin of the pants and respectively located at each margin of the open side of the pants, another pair of said tie strings being respectively disposed at each margin of the open side of the pants below the waist margin for adjusting the size of the leg opening.

2. Seamless deposited rubber pants having a pair of leg openings and waist opening therein, at least one of said leg openings communicating with said waist opening to provide an open side in said pants, and a plurality of pairs of tie strings integral with the pants and projecting from each margin defining said open side, one pair of tie strings being disposed adjacent the waist margin of the pants and another pair of tie strings being disposed in spaced relation below the first-mentioned pair of tie strings.

3. Seamless deposited rubber pants having a pair of leg openings and a waist opening, the margins defining each of said openings being strengthened by reinforcements of rubber integral therewith and a pair of spaced tie-strings integral with the margin of one of said leg openings.

4. A hollow, seamless deposited rubber garment having a waist-opening and a leg-receiving opening, the margins of said openings being strengthened by a reinforcement of rubber integral therewith, and a fastening strip projecting from the margin of said leg-receiving opening and integral with said garment.

5. A form for making seamless, deposited rubber pants comprising a flattened body portion having substantially the outline of the desired pants, a pair of leg-opening defining means disposed in spaced relation on a margin of said body portion, said form on a portion thereof opposite said means being provided with a part defining a waist-receiving opening in the resulting pants, and flattened extensions spaced from said means projecting from oppposite sides of said body portion adjacent said part, each of said extensions defining a reentrant opening in the resulting pants which communicates with the waist-receiving opening, means at the junction of each extension with the body portion for generating a reinforcement integral with the margin of the article at each of said reentrant openings defined by said extensions, the opposite faces of each of said extensions having tie-string forming channels thereon, the bottom surface of each of said channels independently merging with the adjacent surface of the body portion.

6. A form for making hollow, seamless deposited rubber pants, said form comprising a flattened body portion having an outline generally corresponding to the outline of the desired pants, spaced leg and waist-opening defining means provided on the margin of said body portion, and a flattened extension on the margin of said form adjacent one of said opening defining means for defining a side opening in the resulting pants, means at the junction of said extension with the body portion for generating a reinforcement integral with the margin of the resulting pants at said last-mentioned opening, said extension having means on the opposite faces thereof for generating edge reinforced tie strings integral with the front and rear portions respectively of the resulting pants.

7. A form for making seamless deposited rubber pants, comprising a flattened body portion having substantially the outline of the desired pants, a leg-opening defining means on a margin of said body portion, said form on a portion thereof opposite said means being provided with a part defining a waist-receiving opening in the resulting pants, and a flattened extension provided on a margin of said body portion in spaced relation to the first mentioned means for defining a second leg opening in the resulting pants, means at the junction of said extension with the body portion for generating a reinforcement integral with the margin of the resulting pants at said last-mentioned opening, said extension having means on the opposite faces thereof for generating edge reinforced tie-strings integral with the margin of the resulting pants at said second leg opening.

8. A form for making seamless, deposited rubber pants, comprising a flattened body portion, a leg-opening defining means on said body portion, waist-opening defining means on said body portion spaced from said first-mentioned means, and a flattened extension projecting from one margin of said body portion in spaced relation to said first mentioned means for defining a communicating side and leg opening in the resulting pants, means at the junction of said extension with the body portion for generating a reinforcement integral with the margin of the resulting pants at said side and leg opening, the opposite faces of said extension each having means thereon for generating a pair of edge reinforced tie strings integral with said margin of the resulting pants.

9. A form for making seamless, deposited rubber pants, comprising a flattened body portion, spaced leg opening defining means on said body portion, waist opening defining means on said body portion spaced from said first mentioned means, a flattened extension on said body portion adjacent said waist opening defining means for defining an opening in the resulting garment which communicates with the waist opening, and tie-string forming means on opposite faces of said extension for generating a pair of edge-reinforced tie strings integral with the front and rear portions of the resulting pants adjacent the waist opening.

10. A form for making hollow, seamless deposited rubber articles comprising a flattened body portion having substantially the outline of the desired article, at least a part of the edge of said body portion being rounded transversely, the opposite faces of said body portion curving into each other over said rounded edge part, an extension projecting from said body portion adjacent said rounded edge part for defining an opening in the resulting article, edge reinforcement-generating means adjacent the junction of said extension and said body portion for generating an edge reinforcement integral with the margin of the resulting article at said opening, and edge reinforcement-generating means outlining a plurality of spaced tie-string generating surfaces on said extension, each of said tie-string generating surfaces of said extension merging smoothly with the surface of the body portion whereby the resulting tie strings will be integral with the resulting article.

ABRAHAM N. SPANEL.